United States Patent
Berardi et al.

(10) Patent No.: US 6,677,267 B2
(45) Date of Patent: Jan. 13, 2004

(54) POLYMERIZATION CATALYSTS

(75) Inventors: Alain Berardi, Marseille (FR); John Gabriel Speakman, Martigues (FR)

(73) Assignee: BP Chemicals Limited, London (GB)

( * ) Notice: Subject to any disclaimer, the term of this patent is extended or adjusted under 35 U.S.C. 154(b) by 145 days.

(21) Appl. No.: 09/830,229

(22) Filed: Apr. 24, 2001

(65) Prior Publication Data
US 2002/0035031 A1 Mar. 21, 2002

Related U.S. Application Data

(63) Continuation of application No. PCT/GB99/03502, filed on Oct. 21, 1999.

(30) Foreign Application Priority Data

Oct. 26, 1998 (EP) .............................................. 98430023

(51) Int. Cl.[7] .......................... B01J 31/18; B01J 31/22; C08F 4/44
(52) U.S. Cl. ........................ 502/155; 502/157; 526/64; 526/65; 526/161; 526/127; 526/154; 526/172; 526/901; 526/905
(58) Field of Search ................................ 526/161, 171, 526/172, 154, 127, 129, 65, 64, 905, 901; 502/155, 167

(56) References Cited

U.S. PATENT DOCUMENTS 5,955,555 A * 9/1999 Bennett ...................... 526/133

FOREIGN PATENT DOCUMENTS

| EP | 0 924 223 A2 | 6/1999 |
|---|---|---|
| WO | WO98/27124 | 6/1998 |
| WO | WO99/12981 | 3/1999 |

* cited by examiner

*Primary Examiner*—Robert Harlan
(74) *Attorney, Agent, or Firm*—Finnegan, Henderson, Farabow, Garrett and Dunner, L.L.P.

(57) ABSTRACT

The present invention relates to a process for the polymerization and copolymerization of 1-olefins and to a catalyst to be used in said process wherein the catalyst comprises (1) a complex having formula (I) wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the metal M; T is the oxidation state of the metal; b is the valency of the atom or group X; and R 1 to R 7 are each independently selected from hydrogen, halogen, hydrocarbyl, substituted hydrocarbyl, heterohydrocarbyl, substituted heterohydrocarbyl or SiR' 3 where each R' is independently selected from hydrogen, halogen, hydrocarbyl, substituted hydrocarbyl, heterohydrocarbyl, substituted heterohydrocarbyl; and when any two or more of R 1 to R 7 are hydrocarbyl, substituted hydrocarbyl, heterohydrocarbyl or substituted heterohydrocarbyl, said two or more can be linked to form one or more cyclic substituents; (2) an activator which is an alkylalumoxane; and (3) a support material, wherein the atomic ratio of aluminium in the alkylalumoxane (2) to transition metal M in (1) is from 6:1 to 25:1.

45 Claims, No Drawings

POLYMERIZATION CATALYSTS

RELATED APPLICATIONS

This is a continuation of PCT/GB99/03502 filed Oct. 21, 1999.

BACKGROUND OF THE INVENTION

The present invention relates to transition metal compounds and to polymerisation catalyst systems employing them.

The use of certain transition metal compounds to polymerise 1-olefins, for example, ethylene, is well established in the prior art. The use of Ziegler-Natta catalysts, for example, those catalysts produced by activating titanium halides with organometallic compounds such as triethylaluminium, is fundamental to many commercial processes for manufacturing polyolefins. Over the last twenty or thirty years, advances in the technology have led to the development of Ziegler-Natta catalysts which have such high activities that that olefin polymers and copolymers containing very low concentrations of residual catalyst can be produced directly in commercial polymerisation processes. The quantities of residual catalyst remaining in the produced polymer are so small as to render unnecessary their separation and removal for most commercial applications. Such processes can be operated by polymerising the monomers in the gas phase, or in solution or in suspension in a liquid hydrocarbon diluent. Polymerisation of the monomers can be carried out in the gas phase (the "gas phase process"), for example by fluidising under polymerisation conditions a bed comprising the target polyolefin powder and particles of the desired catalyst using a fluidising gas stream comprising the gaseous monomer. In the so-called "solution process" the (co)polymerisation is conducted by introducing the monomer into a solution or suspension of the catalyst in a liquid hydrocarbon diluent under conditions of temperature and pressure such that the produced polyolefin forms as a solution in the hydrocarbon diluent. In the "slurry process" the temperature, pressure and choice of diluent are such that the produced polymer forms as a suspension in the liquid hydrocarbon diluent. These processes are generally operated at relatively low pressures (for example 10–50 bar) and low temperature (for example 50 to 150° C.).

Commodity polyethylenes are commercially produced in a variety of different types and grades. Homopolymerisation of ethylene with transition metal based catalysts leads to the production of so-called "high density" grades of polyethylene. These polymers have relatively high stiffness and are useful for making articles where inherent rigidity is required. Copolymerisation of ethylene with higher 1-olefins (eg butene, hexene or octene) is employed commercially to provide a wide variety of copolymers differing in density and in other important physical properties. Particularly important copolymers made by copolymerising ethylene with higher 1-olefins using transition metal based catalysts are the copolymers having a density in the range of 0.91 to 0.93. These copolymers which are generally referred to in the art as "linear low density polyethylene" are in many respects similar to the so called "low density" polyethylene produced by the high pressure free radical catalysed polymerisation of ethylene. Such polymers and copolymers are used extensively in the manufacture of flexible blown film.

An important feature of the microstructure of the copolymers of ethylene and higher 1-olefins is the manner in which polymerised comonomer units are distributed along the "backbone" chain of polymerised ethylene units. The conventional Ziegler-Natta catalysts have tended to produce copolymers wherein the polymerised comonomer units are clumped together along the chain. To achieve especially desirable film properties from such copolymers the comonomer units in each copolymer molecule are preferably not clumped together, but are well spaced along the length of each linear polyethylene chain. In recent years the use of certain metallocene catalysts (for example biscyclopentadienylzirconium dichloride activated with alumoxane) has provided catalysts with potentially high activity and capable of providing an improved distribution of the comonomer units. However, metallocene catalysts of this type suffer from a number of disadvantages, for example, high sensitivity to impurities when used with commercially available monomers, diluents and process gas streams, the need to use large quantities of expensive alumoxanes to achieve high activity, and difficulties in putting the catalyst on to a suitable support.

WO98/27124 discloses that ethylene may be polymerised by contacting it with certain iron or cobalt complexes of selected 2,6-pyridinecarboxaldehydebis (imines) and 2,6-diacylpyridinebis(imines). These complexes are disclosed as being suitable for preparing homopolymers of ethylene. It is disclosed that in polymerisation processes, the complexes may be used in association with a neutral Lewis acid such as methylaluminoxane (MAO). Ratios of aluminium in the MAO to Fe or Co in the complex exemplified are in the range from 31:1 to 2485:1.

We have developed novel catalysts utilising complexes similar to the above which are disclosed in our copending application WO GB98/2638. This discloses polymerisation of ethylene using a catalyst which comprises a transition metal salt of a 2,6-diacylpyridinebis(imine) supported on silica, with an MAO cocatalyst. Ratios of aluminium in the MAO to transition metal in the complex are stated to range from 0.1–20000:1, preferably 1–2000:1, and typically at least 500:1. Ratios in the examples range from 31:1 upwards.

SUMMARY OF INVENTION

We have now surprisingly discovered that the activity of catalysts comprising the above compounds and MAO in polymerisation of 1-olefins can be maintained or even improved by reducing the ratio of aluminium in the MAO to transition metal. Accordingly in a first aspect the invention provides a catalyst for the polymerisation of olefins comprising (1) a complex having the formula (I)

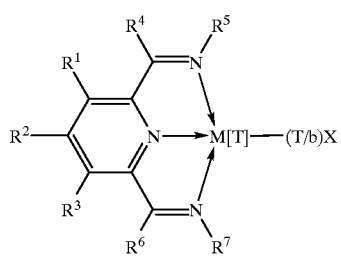

Formula (I)

wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the metal M; T is the oxidation state of the metal; b is the valency of the atom or group X; and $R^1$ to $R^7$ are each independently selected from hydrogen, halogen, hydrocarbyl, substituted hydrocarbyl, heterohydrocarbyl, substituted heterohydrocarbyl or SiR'$_3$ where each R' is independently selected from hydrogen, halogen, hydrocarbyl, substituted hydrocarbyl, heterohydrocarbyl, substituted heterohydrocarbyl; and when any two or more of $R^1$ to $R^7$ are hydrocarbyl, substituted hydrocarbyl, heterohydrocarbyl or substituted heterohydrocarbyl, said two or more can be linked to form one or more cyclic substituents;

(2) an activator which is an alkylalumoxane; and
(3) a support material, wherein the atomic ratio of aluminium in the alkylalumoxane (2) to transition metal M in (1) is from 6:1 to 25:1.

DETAILED DESCRIPTION OF THE INVENTION

As alkylalumoxanes are added to catalysts in order to enhance their activity, the invention is particularly surprising. Alkylalumoxanes are relatively expensive and also undesirable from a safety point of view, so the ability to use smaller quantities whilst maintaining or enhancing polymerisation activity is especially advantageous. It is preferred that the atomic ratio of aluminium to transition metal M is from 8:1 to 22:1, and more preferably from 12:1 to 18:1.

The activator (2) is preferably a ($C_1$–$C_4$) alkylalumoxane, the alkyl group generally being methyl, ethyl, propyl or isobutyl. Preferred is methylalumoxane (also known as methylaluminoxane or MAO) or modified methylalumoxane (MMAO), which additionally contains isobutylalumoxane. The term "alkylalumoxane" as used in this specification includes alkylalumoxanes available commercially which may contain a proportion, typically about 10 wt %, but optionally up to 50 wt %, of the corresponding trialkylaluminium; for instance, commercial MAO usually contains approximately 10% trimethylaluminium (TMA), whilst commercial MMAO contains both TMA and triisobutylaluminium (TIBA). Quantities of alkylalumoxane quoted herein include such trialkylalkylaluminium impurities, and accordingly the amount of aluminium used to calculate the above ratio in this invention is based on the amount present in all 'components' of the alkylalumoxane.

In a preferred complex of Formula (I), $R^5$ is represented by the group "P" and $R^7$ is represented by the group "Q" as follows:

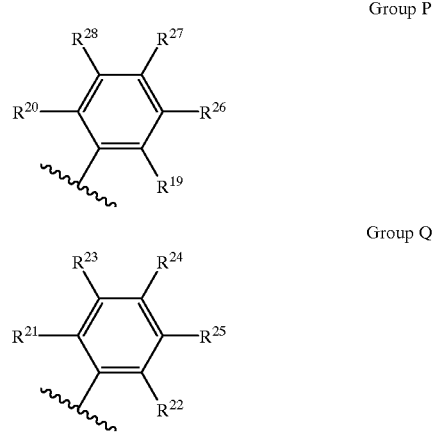

Group P

Group Q wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

The ring systems P and Q are preferably independently 2,6-hydrocarbylphenyl or fused-ring polyaromatic, for example, 1-naphthyl, 2-naphthyl, 1-phenanthrenyl and 8-quinolinyl.

Preferably at least one of $R^{19}$, $R^{20}$, $R^{21}$ and $R^{22}$ is hydrocarbyl, substituted hydrocarbyl, heterohydrocarbyl or substituted heterohydrocarbyl. More preferably at least one of $R^{19}$ and $R^{20}$, and at least one of $R^{21}$ and $R^{22}$, is hydrocarbyl, substituted hydrocarbyl, heterohydrocarbyl or substituted heterohydrocarbyl. Most preferably $R^{19}$, $R^{20}$, $R^{21}$ and $R^{22}$ are all independently selected from hydrocarbyl, substituted hydrocarbyl, heterohydrocarbyl or substituted heterohydrocarbyl. $R^{19}$, $R^{20}$, $R^{21}$ and $R^{22}$ are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzyl.

$R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are preferably independently selected from hydrogen and $C_1$ to $C_8$ hydrocarbyl, for example, methyl, ethyl, n-propyl, n-butyl, t-butyl, n-hexyl, n-octyl, phenyl and benzyl.

$R^{24}$ and $R^{27}$ are preferably each independently selected from ethyl, n-propyl, iso-propyl, n-butyl, sec-butyl, tert.-butyl, n-pentyl, neopentyl, n-hexyl, 4-methylpentyl, n-octyl, phenyl and benzyl, or alternatively are each independently fluorine, chlorine, bromine or iodine, optionally both fluorine.

In an alternative embodiment $R^5$ is a group having the formula —$NR^{29}R^{30}$ and $R^7$ is a group having the formula —$NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more can be linked to form one or more cyclic substituents.

Each of the nitrogen atoms is coordinated to the metal by a "dative" bond, ie a bond formed by donation of a lone pair of electrons from the nitrogen atom. The remaining bonds on each of these atoms are covalent bonds formed by electron sharing between the atoms and the organic ligand as shown in the defined formula for the metal complex illustrated above.

Preferably in Formula (I) above M is Fe[II], Fe[III], Ru[II], Mn[II], Co[II], Ru[III] or Ru [IV].

Yet further compounds suitable for the catalyst systems of the present invention are those comprising the skeletal unit depicted in Formula T:

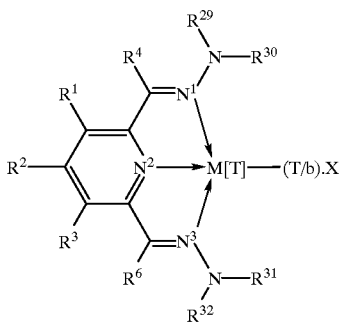

Formula T wherein M is Fe[II], Fe[III], Co[I], Co[II], Co[III], Mn[I], Mn[II], Mn[III], MN[IV], Ru[II], Ru[III] or Ru[IV]; X represents an atom or group covalently or ionically bonded to the transition metal M; T is the oxidation state of the transition metal M and b is the valency of the atom or group X; $R^1$ to $R^4$, $R^6$ and $R^{29}$ to $R^{32}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more can be linked to form one or more cyclic substituents.

The atom or group represented by X in the compounds of Formula (I) and T can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

In the compound of Formula (I) of the present invention, M is preferably Fe[II]. In the compounds of Formula T of the present invention, M is preferably Fe[II], Mn[II] or Co[II].

The following are examples of nitrogen-containing transition metal complexes that can be employed in the catalyst of the present invention:
2,6-diacetylpyridinebis(2,6-diisopropylanil)$FeCl_2$, 2,6-diacetylpyridine(2,6-diisopropylanil)$MnCl_2$
2,6-diacetylpyridine(2,6-diisopropylanil)$CoCl_2$
2,6-diacetylpyridinebis(2-tert.-butylanil)$FeCl_2$
2,6-diacetylpyridinebis(2,3-dimethylanil)$FeCl_2$
2,6-diacetylpyridinebis(2-methylanil)$FeCl_2$
2,6-diacetylpyridinebis(2,4-dimethylanil)$FeCl_2$
2,6-diacetylpyridinebis(2,6-dimethylanil)$FeCl_2$
2,6-diacetylpyridinebis(2,4,6 trimethylanil)$FeCl_2$
2,6-dialdiminepyridinebis(2,6-dimethylanil)$FeCl_2$
2,6-dialdiminepyridinebis(2,6-diethylanil)$FeCl_2$
2,6-dialdiminepyridinebis(2,6-diisopropylanil)$FeCl_2$
2,6-dialdiminepyridinebis(1-naphthil)$FeCl_2$ and
2,6-bis(1,1-diphenylhydrazone)pyridine.$FeCl_2$.

A preferred complex of the present invention is 2,6-diacetylpyridinebis(2,4,6 trimethyl anil)$FeCl_2$.

The polymerisation catalyst system of the invention may additionally comprise (3) a neutral Lewis base. Neutral Lewis bases are well known in the art of Ziegler-Natta catalyst polymerisation technology. Examples of classes of neutral Lewis bases suitably employed in the present invention are unsaturated hydrocarbons, for example, alkenes (other than 1-olefins) or alkynes, primary, secondary and tertiary amines, amides, phosphoramides, phosphines, phosphites, ethers, thioethers, nitriles, carbonyl compounds, for example, esters, ketones, aldehydes, carbon monoxide and carbon dioxide, sulphoxides, sulphones and boroxines. Although 1-olefins are capable of acting as neutral Lewis bases, for the purposes of the present invention they are regarded as monomer or comonomer 1-olefins and not as neutral Lewis bases per se. However, alkenes which are internal olefins, for example, 2-butene and cyclohexene are regarded as neutral Lewis bases in the present invention. Preferred Lewis bases are tertiary amines and aromatic esters, for example, dimethylaniline, diethylaniline, tributylamine, ethylbenzoate and benzylbenzoate. In this particular aspect of the present invention, components (1), (2) and (3) of the catalyst system can be brought together simultaneously or in any desired order. However, if components (2) and (3) are compounds which interact together strongly, for example, form a stable compound together, it is preferred to bring together either components (1) and (2) or components (1) and (3) in an initial step before introducing the final defined component. Preferably components (1) and (3) are contacted together before component (2) is introduced. The quantities of components (1) and (2) employed in the preparation of this catalyst system are suitably as described above in relation to the catalysts of the present invention. The quantity of the neutral Lewis Base [component (3)] is preferably such as to provide a ratio of component (1):component (3) in the range 100:1 to 1:1000, most preferably in the range 1:1 to 1:20. Components (1), (2) and (3) of the catalyst system can brought together, for example, as the neat materials, as a suspension or solution of the materials in a suitable diluent or solvent (for example a liquid hydrocarbon), or, if at least one of the components is volatile, by utilising the vapour of that component. The components can be brought together at any desired temperature. Mixing the components together at room temperature is generally satisfactory. Heating to higher temperatures e.g. up to 120° C. can be carried out if desired, e.g. to achieve better mixing of the components. It is preferred to carry out the bringing together of components (1), (2) and (3) in an inert atmosphere (e.g. dry nitrogen) or in vacuo. If it is desired to use the catalyst on a support material (see below), this can be achieved, for example, by preforming the catalyst system comprising components (1), (2) and (3) and impregnating the support material preferably with a solution thereof, or by introducing to the support material one or more of the components simultaneously or sequentially. If desired the support material itself can have the properties of a neutral Lewis base and can be employed as, or in place of, component (3). An example of a support material having neutral Lewis base properties is poly(aminostyrene) or a copolymer of styrene and aminostyrene (ie vinylaniline).

The catalysts of the present invention can if desired comprise more than one of the defined compounds. Alternatively, the catalysts of the present invention can also include one or more other types of transition metal compounds or catalysts, for example, nitrogen containing catalysts such as those described in our copending applications PCT/GB98/02638 or GB 9903402.7. Examples of such other catalysts include 2,6-diacetylpyridinebis(2,4,6-trimethyl anil)$FeCl_2$.

The catalysts of the present invention can also include one or more other types of catalyst, such as those of the type used in conventional Ziegler-Natta catalyst systems, metallocene-based catalysts, monocyclopentadienyl- or constrained geometry based catalysts, or heat activated supported chromium oxide catalysts (eg Phillips-type catalyst).

The catalysts of the present invention can be unsupported or supported on a support material, for example, silica, alumina, $MgCl_2$ or zirconia, or on a polymer or prepolymer, for example polyethylene, polypropylene, polystyrene, or poly(aminostyrene).

If desired the catalysts can be formed in situ in the presence of the support material, or the support material can be pre-impregnated or premixed, simultaneously or sequentially, with one or more of the catalyst components. The catalysts of the present invention can if desired be supported on a heterogeneous catalyst, for example, a magnesium halide supported Ziegler Natta catalyst, a Phillips type (chromium oxide) supported catalyst or a supported metallocene catalyst. Formation of the supported catalyst can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The present invention further provides a process for the polymerisation and copolymerisation of 1-olefins, comprising contacting the monomeric olefin under polymerisation conditions with the polymerisation catalyst or catalyst system of the present invention A preferred process comprises the steps of:

a) preparing a prepolymer-based catalyst by contacting one or more 1-olefins with a catalyst system, and b) contacting the prepolymer-based catalyst with one or more 1-olefins, wherein the catalyst system is as defined above.

In the text hereinbelow, the term "catalyst" is intended to include "catalyst system" as defined previously and also "prepolymer-based catalyst" as defined above.

The polymerisation conditions can be, for example, solution phase, slurry phase, gas phase or bulk phase, with polymerisation temperatures ranging from −100° C. to +300° C., and at pressures of atmospheric and above, particularly from 140 to 4100 kPa. If desired, the catalyst can be used to polymerise ethylene under high pressure/high temperature process conditions wherein the polymeric material forms as a melt in supercritical ethylene. Preferably the polymerisation is conducted under gas phase fluidised bed or stirred bed conditions.

Prior to the polymerisation, further support material impregnated with a compound of the formula $MR_3$, where each R is independently $C_1-C_{12}$ alkyl or halo, and M is Al, Li, B, Mg or Zn, may be added to the reactor vessel; this acts as a poison scavenger. The above calculation of Al:M ratio does not include any Al impregnated in this additional support material.

Optionally, a compound of the formula $AlR_3$, where each R is independently $C_1-C_{12}$ alkyl or halo, may be separately added to the reactor. Again, the aluminium thereby added is not included in the calculation of the above ratio. The three substituents R in the compound of the formula $AlR_3$, which may be the same or different, are preferably hydrogen, methyl, ethyl, butyl or chloro. Preferred compounds $AlR_3$ include trimethylaluminium (TMA), triethylaluminium (TEA), tri-isobutylaluminium (TIBA), tri-n-octylaluminium, ethylaluminium dichloride and diethylaluminium chloride. Most preferred are TMA and TIBA.

Suitable monomers for use in the polymerisation process of the present invention are, for example, ethylene and $C_{2-20}$ α-olefins, specifically propylene, 1-butene, 1-pentene, 1-hexene, 4-methylpentene-1, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Other monomers include methyl methacrylate, methyl acrylate, butyl acrylate, acrylonitrile, vinyl acetate, and styrene. Preferred monomers for homopolymerisation processes are ethylene and propylene.

The catalysts and process of the invention can also be used for copolymerising ethylene or propylene with each other or with other 1-olefins such as 1-butene, 1-hexene, 4-methylpentene-1, and octene, or with other monomeric materials, for example, methyl methacrylate, methyl acrylate, butyl acrylate, acrylonitrile, vinyl acetate, and styrene.

Irrespective of the polymerisation or copolymerisation technique employed, polymerisation or copolymerisation is typically carried out under conditions that substantially exclude oxygen, water, and other materials that act as catalyst poisons. Also, polymerisation or copolymerisation can be carried out in the presence of additives to control polymer or copolymer molecular weights.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase, bulk phase or solution phase polymerisation conditions. The quantity of hydrogen gas to be employed to give the desired average molecular weight can be determined by simple "trial and error" polymerisation tests.

The polymerisation process of the present invention provides polymers and copolymers, especially ethylene polymers, at remarkably high productivity (based on the amount of polymer or copolymer produced per unit weight of complex employed in the catalyst system). This means that relatively very small quantities of transition metal complex are consumed in commercial processes using the process of the present invention. It also means that when the polymerisation process of the present invention is operated under polymer recovery conditions that do not employ a catalyst separation step, thus leaving the catalyst, or residues thereof, in the polymer (e.g. as occurs in most commercial slurry and gas phase polymerisation processes), the amount of transition metal complex in the produced polymer can be very small.

Slurry phase polymerisation conditions or gas phase polymerisation conditions are particularly useful for the production of high or low density grades of polyethylene, and polypropylene. In these processes the polymerisation conditions can be batch, continuous or semi-continuous. Furthermore, one or more reactors may be used, e.g. from two to five reactors in series. Different reaction conditions, such as different temperatures or hydrogen concentrations may be employed in the different reactors. In the slurry phase process and the gas phase process, the catalyst is generally metered and transferred into the polymerisation zone in the form of a particulate solid either as a dry powder (e.g. with an inert gas) or as a slurry. This solid can be, for example, a solid catalyst system formed from the one or more of complexes of the invention and an activator with or without other types of catalysts, or can be the solid catalyst alone with or without other types of catalysts. In the latter situation, the activator can be fed to the polymerisation zone, for example as a solution, separately from or together with the solid catalyst. Preferably the catalyst system or the transition metal complex component of the catalyst system employed in the slurry polymerisation and gas phase polymerisation is supported on one or more support materials. Most preferably the catalyst system is supported on the support material prior to its introduction into the polymerisation zone. Suitable support materials are, for example, silica, alumina, zirconia, talc, kieselguhr, or magnesia. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques. Once the polymer product is discharged from the reactor, any associated and absorbed hydrocarbons are substantially removed, or degassed, from the polymer by, for example, pressure letdown or gas purging using fresh or recycled steam, nitrogen or light hydrocarbons (such as ethylene). Recovered gaseous or liquid hydrocarbons may be recycled to the polymerisation zone.

In the slurry phase polymerisation process the solid particles of catalyst, or supported catalyst, are fed to a polymerisation zone either as dry powder or as a slurry in the polymerisation diluent. The polymerisation diluent is compatible with the polymer(s) and catalyst(s), and may be an alkane such as hexane, heptane, isobutane, or a mixture of hydrocarbons or paraffins. Preferably the particles are fed to a polymerisation zone as a suspension in the polymerisation diluent. The polymerisation zone can be, for example, an autoclave or similar reaction vessel, or a continuous loop reactor, e.g. of the type well-know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

In bulk polymerisation processes, liquid monomer such as propylene is used as the polymerisation medium.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid in the polymerisation zone is small in relation to the quantity of polymer present. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

For typical production of impact copolymers, homopolymer formed from the first monomer in a first reactor is reacted with the second monomer in a second reactor. For manufacture of propylene/ethylene impact copolymer in a gas-phase process, propylene is polymerized in a first reactor; reactive polymer transferred to a second reactor in which ethylene or other comonomer is added. The result is an intimate mixture of a isotactic polypropylene chains with chains of a random propylene/ethylene copolymer. A random copolymer typically is produced in a single reactor in which a minor amount of a comonomer (typically ethylene) is added to polymerizing chains of propylene.

Methods for operating gas phase fluidised bed processes for making polyethylene, ethylene copolymers and polypropylene are well known in the art. The process can be operated, for example, in a vertical cylindrical reactor equipped with a perforated distribution plate to support the bed and to distribute the incoming fluidising gas stream through the bed. The fluidising gas circulating through the bed serves to remove the heat of polymerisation from the bed and to supply monomer for polymerisation in the bed. Thus the fluidising gas generally comprises the monomer(s) normally together with some inert gas (eg. nitrogen or inert hydrocarbons such as methane, ethane, propane, butane, pentane or hexane) and optionally with hydrogen as molecular weight modifier. The hot fluidising gas emerging from the top of the bed is led optionally through a velocity reduction zone (this can be a cylindrical portion of the reactor having a wider diameter) and, if desired, a cyclone and or filters to disentrain fine solid particles from the gas stream. The hot gas is then led to a heat exchanger to remove at least part of the heat of polymerisation. Catalyst is preferably fed continuously or at regular intervals to the bed. At start up of the process, the bed comprises fluidisable polymer which is preferably similar to the target polymer. Polymer is produced continuously within the bed by the polymerisation of the monomer(s). Preferably means are provided to discharge polymer from the bed continuously or at regular intervals to maintain the fluidised bed at the desired height. The process is generally operated at relatively low pressure, for example, at 10 to 50 bars, and at temperatures for example, between 50 and 120° C. The temperature of the bed is maintained below the sintering temperature of the fluidised polymer to avoid problems of agglomeration.

In the gas phase fluidised bed process for polymerisation of olefins the heat evolved by the exothermic polymerisation reaction is normally removed from the polymerisation zone (i.e. the fluidised bed) by means of the fluidising gas stream as described above. The hot reactor gas emerging from the top of the bed is led through one or more heat exchangers wherein the gas is cooled. The cooled reactor gas, together with any make-up gas, is then recycled to the base of the bed. In the gas phase fluidised bed polymerisation process of the present invention it is desirable to provide additional cooling of the bed (and thereby improve the space time yield of the process) by feeding a volatile liquid to the bed under conditions such that the liquid evaporates in the bed thereby absorbing additional heat of polymerisation from the bed by the "latent heat of evaporation" effect. When the hot recycle gas from the bed enters the heat exchanger, the volatile liquid can condense out. In one embodiment of the present invention the volatile liquid is separated from the recycle gas and reintroduced separately into the bed. Thus, for example, the volatile liquid can be separated and sprayed into the bed. In another embodiment of the present invention the volatile liquid is recycled to the bed with the recycle gas. Thus the volatile liquid can be condensed from the fluidising gas stream emerging from the reactor and can be recycled to the bed with recycle gas, or can be separated from the recycle gas and then returned to the bed.

The method of condensing liquid in the recycle gas stream and returning the mixture of gas and entrained liquid to the bed is described in EP-A-0089691 and EP-A-0241947. It is preferred to reintroduce the condensed liquid into the bed separate from the recycle gas using the process described in our U.S. Pat. No. 5,541,270, the teaching of which is hereby incorporated into this specification.

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

Although not usually required, upon completion of polymerisation or copolymerisation, or when it is desired to terminate polymerisation or copolymerisation or at least temporarily deactivate the catalyst or catalyst component of this invention, the catalyst can be contacted with water, alcohols, acetone, or other suitable catalyst deactivators a manner known to persons of skill in the art.

Homopolymerisation of ethylene with the catalysts of the invention may produce so-called "high density" grades of polyethylene. These polymers have relatively high stiffness and are useful for making articles where inherent rigidity is required. Copolymerisation of ethylene with higher 1-olefins (eg butene, hexene or octene) can provide a wide variety of copolymers differing in density and in other important physical properties. Particularly important copolymers made by copolymerising ethylene with higher 1-olefins with the catalysts of the invention are the copolymers having a density in the range of 0.91 to 0.93. These copolymers which are generally referred to in the art as linear low density polyethylene, are in many respects similar to the so called low density polyethylene produced by the high pressure free radical catalysed polymerisation of ethylene. Such polymers and copolymers are used extensively in the manufacture of flexible blown film.

Propylene polymers produced by the process of the invention include propylene homopolymer and copolymers of propylene with less than 50 mole % ethylene or other alpha-olefin such as butene-1, pentene-1, 4-methylpentene-1, or hexene-1, or mixtures thereof. Propylene polymers also may include copolymers of propylene with minor amounts of a copolymerizable monomer. Typically, most useful are normally-solid polymers of propylene containing polypropylene crystallinity, random copolymers of propylene with up to about 10 wt. % ethylene, and impact copolymers containing up to about 20 wt. % ethylene or other alpha-olefin. Polypropylene homopolymers may contain a small amount (typically below 2 wt. %) of other monomers to the extent the properties of the homopolymer are not affected significantly.

Propylene polymers may be produced which are normally solid, predominantly isotactic, poly α-olefins. Levels of stereorandom by-products are sufficiently low so that useful products can be obtained without separation thereof. Typically, useful propylene homopolymers show polypropylene crystallinity and have isotactic indices above 90 and many times above 95. Copolymers typically will have lower isotactic indices, typically above 80–85.

Depending upon polymerisation conditions known in the art, propylene polymers with melt flow rates from below 1 to above 1000 may be produced in a reactor. For many applications, polypropylenes with a MFR from 2 to 100 are typical. Some uses such as for spunbonding may use a polymer with an MFR of 500 to 2000.

Peroxide compounds may be added to ethylene or propylene polymers. For ethylene based polymers, peroxides can be used to give cross-linking in the polymer. For the preparation of high MFR propylene polymers, peroxide compounds may be added during extrusion for controlled rheology to increase the melt flow rate of polymer. Peroxide acts to break long polymer chains and has the effect of both increasing MFR and narrowing the molecular weight distribution (Mw/Mn) or polydispersity. A typical reactor polypropylene powder with an MFR of 2 g/10 min. by controlled rheology treatment with peroxide in an extruder may form a polymer with an MFR of 20–40. By varying the type, amount of, and process conditions using, peroxide, the final polymer MFR may be controlled as known in the art.

Depending upon the use of the polymer product, minor amounts of additives are typically incorporated into the polymer formulation such as acid scavengers, antioxidants, stabilizers, and the like. Generally, these additives are incorporated at levels of about 25 to 2000 ppm, typically from about 50 to about 1000 ppm, and more typically 400 to 1000 ppm, based on the polymer.

In use, polymers or copolymers made according to the invention in the form of a powder are conventionally compounded into pellets. Examples of uses for polymer compositions made according to the invention include use to form fibres, extruded films, tapes, spunbonded webs, moulded or thermoformed products, and the like. The polymers may be blown into films, or may be used for making a variety of moulded or extruded articles such as pipes, and containers such as bottles or drums. Specific additive packages for each application may be selected as known in the art. Examples of supplemental additives include slip agents, anti-blocks, anti-stats, mould release agents, primary and secondary anti-oxidants, clarifiers, nucleants, uv stabilizers, and the like. Classes of additives are well known in the art and include phosphite antioxidants, hydroxylamine (such as N,N-dialkyl hydroxylamine) and amine oxide (such as dialkyl methyl amine oxide) antioxidants, hindered amine light (uv) stabilizers, phenolic stabilizers, benzofuranone stabilizers, and the like. Various olefin polymer additives are described in U.S. Pat. Nos. 4,318,845, 4,325,863, 4,590,231, 4,668,721, 4,876,300, 5,175,312, 5,276,076, 5,326,802, 5,344,866, 5,596,033, and 5,625,090.

Fillers such as silica, glass fibers, talc, and the like, nucleating agents, and colourants also may be added to the polymer compositions as known by the art.

The present invention is illustrated in the following Examples.

EXAMPLES

Example 1a

Preparation of 2,6-diacetylpyridine bis (2,4,6-trimethylphenyl amine) $FeCl_2$ Complex 4 g of 2,6-diacetylpyridine, 10.32 ml of 2,4,6-trimethylaniline and 0.1 g of p-toluenesulphonic acid monohydrate were added to 300 ml of dry toluene in a 500 ml round bottomed flask. A 20 ml Dean-Stark heavy fractionating column and condenser were attached and the mixture heated with stirring to 160° C. The reaction appeared to have gone to completion in about 3 hours. The solution was then evacuated and 200 ml of methanol added. 2,6-diacetylpyridine bis (2,4,6-trimethylphenyl amine) precipitated out and was isolated by filtration and washed with 3 aliquots of 20 ml of methanol.

3.19 g of iron(II) chloride were weighed into a half liter Schlenk tube and 400 ml of n-butanol added. The suspension was warmed to 90° C. and stirred for 3 hours. 10 g of 2,6-diacetylpyridine bis (2,4,6-trimethylphenyl amine) was added as a solid at 80° C. The reaction was stirred for 1 hour then at 25° C. over 3 days. The resultant blue suspension was allowed to settle and the supernatant liquid decanted off. Two washes of the precipitate with 200 ml aliquots of toluene were carried out, followed by one wash with 100 ml of n-pentane. The residual blue solid was pumped in vacuo for 6 hours till dry. It was stored and handled in a nitrogen atmosphere.

Example 1b

Preparation of the Catalyst

The equipment used for calcining the silica support was composed essentially of a vertical quartz cylinder, 75 cm high and 5 cm in diameter, above which was placed a disengagement zone. This calcinator was equipped with a fluidisation grid made from porous quartz and positioned in the lower part of the quartz cylinder. It was also equipped with an electrical resistance heater and a supply of fluidising nitrogen.

Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 600° C. at a rate of 100° C./h. The silica was then maintained at 600° C. for 16 hours in the fluidised state. The silica was then cooled to 25° C. and stored under dry nitrogen.

All subsequent operations were carried out in a nitrogen atmosphere. 12.5 g of the silica thus dried were suspended in a solution of 0.66 g of methylaluminoxane (Witco, Bergkamen, Germany) in 11.1 g of toluene. The suspension was agitated for 2 hours at 25° C. The silica thus treated was washed five times with 20 ml of toluene. The treated silica was then dried under vacuum.

2.89 g of the treated silica were suspended in 20 ml of toluene and 0.1932 g of the above iron complex (see 1a) in 10 ml of toluene was added. The suspension was agitated for 17 hours at 25° C. The catalyst thus prepared was washed five times with 20 ml of toluene, and then dried under vacuum.

The catalyst thus prepared contained 0.419% by weight of iron and 2.88% by weight of aluminium. This corresponds to an atomic ratio Al/Fe of 14.3.

Example 1c

Ethylene Polymerisation in the Gas Phase 400 g of polyethylene pellets were introduced into a stainless steel reactor of capacity 2.6 liters equipped with a stirrer and maintained under a nitrogen atmosphere. The reactor was heated to 100° C., stirred at 50 rpm and 0.7 g of silica previously treated with 1.5 mmole/g of triethylaluminium was added as poison scavenger. Next 0.1025 g of the above catalyst (see 1b) was added. Then hydrogen was introduced to pressure the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hour and 18 minutes, during which period 223 g of polyethylene were produced. This corresponds to an average activity of 3372 g/mmol Fe/h/bar. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load)=3.74 g/10 mins
melt index (5 kg load)=14.0 g/10 mins
melt index (21.6 kg load)=163 g/10 mins
density=>960 kg/m$^3$
fines<125 μm=0.83% by weight
residual iron level=1.9 ppm

Example 2a

Preparation of 2,6-diacetylpyridine bis (2,4,6-trimethylphenyl amine) $FeCl_2$ Complex The same iron complex was used for Example 2 as for Example 1.

Example 2b

Preparation of the Catalyst

The equipment used for calcining the silica support was composed essentially of a vertical quartz cylinder, 75 cm high and 5 cm in diameter, above which was placed a disengagement zone. This calcinator was equipped with a fluidisation grid made from porous quartz and positioned in the lower part of the quartz cylinder. It was also equipped with an electrical resistance heater and a supply of fluidising nitrogen.

Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 600° C. at a rate of 100° C./h. The silica was then maintained at 600° C. for 16 hours in the fluidised state. The silica was then cooled to 25° C. and stored under dry nitrogen.

All subsequent operations were carried out in a nitrogen atmosphere. 12.5 g of the silica thus dried were suspended in a solution of 0.66 g of methylaluminoxane (Witco, Bergkamen, Germany) in 11.1 g of toluene. The suspension was agitated for 2 hours at 25° C. The silica thus treated was washed five times with 20 ml of toluene. The treated silica was then dried under vacuum.

2.87 g of the treated silica were suspended in 20 ml of toluene and 0.088 g of the above iron complex (see 1a) in 10 ml of toluene was added. The suspension was agitated for 17 hours at 25° C. The catalyst thus prepared was washed five times with 20 ml of toluene. The catalyst was then dried under vacuum.

The catalyst thus prepared contained 0.255% by weight of iron and 2.88% by weight of aluminium. This corresponds to an atomic ratio Al/Fe of 23.4.

Example 2c

Ethylene Polymerisation in the Gas Phase 400 g of polyethylene pellets were introduced into a stainless steel reactor of capacity 2.6 liters equipped with a stirrer and maintained under a nitrogen atmosphere. The reactor was heated to 100° C., stirred at 50 rpm and 0.7 g of silica previously treated with 1.5 mmole/g of triethylaluminium was added as poison scavenger. Next 0.1082 g of the above catalyst (see 2b) was added. Then hydrogen was introduced to pressure the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hour and 57 minutes, during which period 224 g of polyethylene were produced. This corresponds to an average activity of 3424 g/mmol Fe/h/bar. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load)=0.8 g/10 mins
melt index (5 kg load)=3.0 g/10 mins
melt index (21.6 kg load)=47 g/10 mins
density=>962 kg/m$^3$
fines<125 μm=0.34% by weight
residual iron level=1.2 ppm Example 3

Comparative Example

Example 3a

Preparation of 2,6-diacetylpyridine bis (2,4,6-trimethylphenyl amine) FeCl$_2$ Complex The same iron complex was used for Example 3 as for Example 1.

Example 3b

Preparation of the Catalyst

The equipment used for calcining the silica support was composed essentially of a vertical quartz cylinder, 75 cm high and 5 cm in diameter, above which was placed a disengagement zone. This calcinator was equipped with a fluidisation grid made from porous quartz and positioned in the lower part of the quartz cylinder. It was also equipped with an electrical resistance heater and a supply of fluidising nitrogen.

Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 600° C. at a rate of 100° C./h. The silica was then maintained at 600° C. for 16 hours in the fluidised state. The silica was then cooled to 25° C. and stored under dry nitrogen.

All subsequent operations were carried out in a nitrogen atmosphere. 5.30 g of the silica thus dried was suspended in a solution of 1.19 g of methylaluminoxane (Witco, Bergkamen, Germany) in 17.07 g of toluene. The suspension was agitated for 2 hours at 25° C. The silica thus treated was washed five times with 20 ml of toluene and then dried under vacuum. 1.62 g of the treated silica was suspended in 20 ml of toluene and 0.045 g of the above iron complex (see 1a) in 10 ml of toluene was added. The suspension was agitated for 17 hours at 25° C. The catalyst thus prepared was washed five times with 20 ml of toluene. The catalyst was then dried under vacuum.

The catalyst thus prepared contained 0.226% by weight of iron and 4.6% by weight of aluminium. This corresponds to an atomic ratio Al/Fe of 42.3.

Example 3c

Ethylene Polymerisation in the Gas Phase 400 g of polyethylene pellets were introduced into a stainless steel reactor of capacity 2.6 liters equipped with a stirrer and maintained under a nitrogen atmosphere. The reactor was heated to 100° C., stirred at 50 rpm and 0.7 g of silica previously treated with 1.5 mmole/g of triethylaluminium was added as poison scavenger. Next 0.131 g of the above catalyst (see 3b) was added. Then hydrogen was introduced to pressure the reactor to 0.2 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 4 hours and 28 minutes, during which period 132 g of polyethylene were produced. The average activity during this period was 1077 g/mmolFe/h/bar. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load)=3.17 melt index (5 kg load)=12.3 melt index (8.5 kg load)=32.5 residual iron level=2.2 ppm

Example 4

Comparative Example

Example 4a

Preparation of 2,6-diacetylpyridine bis (2,4,6-trimethylphenyl amine) FeCl$_2$ Complex The same iron complex was used for Example 4 as for Example 1.

Example 4b

Preparation of the Catalyst

The equipment used for calcining the silica support was composed essentially of a vertical quartz cylinder, 75 cm high and 5 cm in diameter, above which was placed a disengagement zone. This calcinator was equipped with a fluidisation grid made from porous quartz and positioned in the lower part of the quartz cylinder. It was also equipped with an electrical resistance heater and a supply of fluidising nitrogen.

Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 600° C. at a rate of 100° C./h. The silica was then maintained at 600° C. for 16 hours in the fluidised state. The silica was then cooled to 25° C. and stored under dry nitrogen.

All subsequent operations were carried out in a nitrogen atmosphere. 5.14 g of the silica thus dried were suspended in a solution of 0.63 g of methylaluminoxane (Witco, Bergkamen, Germany) in 8.99 g of toluene. The suspension was agitated for 2 hours at 25° C. The silica thus treated was washed five times with 20 ml of toluene and then dried under vacuum. 2.14 g of the treated silica was suspended in 20 ml of toluene and 0.074 g of the above iron complex (see 1a) in 10 ml of toluene was added. The suspension was agitated for 17 hours at 25° C. The catalyst thus prepared was washed five times with 20 ml of toluene. The catalyst was then dried under vacuum.

The catalyst thus prepared contained 0.237% by weight of iron and 5.94% by weight of aluminium. This corresponds to an atomic ratio Al/FE of 52.0.

Example 4c

Ethylene Polymerisation in the Gas Phase 400 g of polyethylene pellets were introduced into a stainless steel reactor of capacity 2.6 liters equipped with a stirrer and maintained under a nitrogen atmosphere. The reactor was heated to 100° C., stirred at 50 rpm and 0.7 g of silica previously treated with 1.5 mmole/g of triethylaluminium was added as poison scavenger. Next 0.1038 g of the above catalyst (see 4b) was added. Then hydrogen was introduced to pressure the reactor to 0.2 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 3 hours and 58 minutes, during which period 212 g of polyethylene were produced. The average activity during this period was 2047 g/mmolFe/h/bar. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load)=1.29 melt index (5 kg load)=4.66 melt index (8.5 kg load)=11.57 residual iron level=1.2 ppm

Example 5a

Preparation of 2,6-diacetylpyridine bis (2,4,6-trimethylphenyl amine)FeCl$_2$ Complex 4 g of 2,6-diacetylpyridine, 10.32 ml of 2,4,6-trimethylaniline and 0.2 g of p-toluenesulphonic acid monohydrate were added to 150 ml of dry toluene in a 250 ml round bottomed flask. A 20 ml Dean-Stark heavy fractionating column and condenser were attached and the mixture heated with stirring to 160° C. The reaction appeared to have gone to completion in about 3 hours. The solution was then evacuated and 100 ml of methanol added. 2,6-diacetylpyridine bis (2,4,6-trimethylphenyl amine) precipitated out and was isolated by filtration and washed with 3 aliquots of 10 ml of methanol.

3.19 g of iron(II) chloride were weighed into a half liter Schlenk tube and 400 ml of n-butanol added. The suspension was warmed to 90° C. and stirred for 3 hours. 10 g of 2,6-diacetylpyridine bis (2,4,6-trimethylphenyl amine) was added as a solid at 80° C. The reaction was stirred for 1 hour then at 25° C. over 3 days. The resultant blue suspension was allowed to settle and the supernatant liquid decanted off. 2 washes of the precipitate with 200 ml aliquots of toluene were carried out, followed by one wash with 100 ml of n-pentane. The residual blue solid was pumped in vacuo for 6 hours till dry. It was stored and handled in a nitrogen atmosphere.

Example 5b

Preparation of the Catalyst

The equipment used for calcining the silica support essentially comprised a vertical quartz cylinder, 75 cm high and 5 cm in diameter, above which was placed a disengagement zone. This calcinator was equipped with a fluidisation grid made from porous quartz and positioned in the lower part of the quartz cylinder. It was also equipped with an electrical resistance heater and a supply of fluidising nitrogen.

Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 600° C. at a rate of 100° C./h. The silica was then maintained at 600° C. for 16 hours in the fluidised state. The silica was then cooled to 25° C. and stored under dry nitrogen.

All subsequent operations were carried out in a nitrogen atmosphere. 4.06 g of the silica thus dried were suspended in a solution of 0.35 g of methylaluminoxane (Witco, Bergkamen, Germany) in 17 g of toluene. The suspension was agitated for 2 hours at 25° C. The silica thus treated was washed five times with 20 ml of toluene. The treated silica was then dried under vacuum.

The silica thus treated was suspended in 20 ml of toluene and 0.1492 g of the above iron complex (see 5a) was added. The suspension was agitated for 17 hours at 25° C. The catalyst thus prepared was washed five times with 20 ml of toluene. The catalyst was then dried under vacuum.

The catalyst thus prepared contained 0.39% by weight of iron and 4.01% by weight of aluminium. This corresponds to an atomic ratio Al/Fe of 21.3.

Example 5c

Ethylene Polymerisation in the Gas Phase 400 g of polyethylene pellets were introduced into a stainless steel reactor of capacity 2.5 liters equipped with a stirrer and maintained under a nitrogen atmosphere. The reactor was heated to 98° C., stirred at 25 rpm and 0.7 g of silica previously treated with 1.5 mmole/g of triethylaluminium was added as poison scavenger. Next 0.0825 g of the above catalyst (see 5b) was added. Then hydrogen was introduced to pressure the reactor to 0.05 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hour and 15 minutes, during which period 175 g of polyethylene were produced. This corresponds to a catalyst yield of 2121 g polymer/g catalyst. The average activity during this polymerisation was 2689 g/mM.h.b. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load) (MI)=1.50
melt index (21.6 kg load) (HLMI)=82.27
melt index ratio (HLMI/MI)=54.8
residual iron level=2.2 ppm

Example 6a

Preparation of 2,6-diacetylpyridine bis (2,4,6-trimethylphenyl amine)FeCl$_2$ Complex This was carried out exactly as described in example 5a.

Example 6b

Preparation of the Catalyst

The equipment used for calcining the silica support was as in Example 5b. Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 700° C. at a rate of 100° C./h. The silica was then maintained at 700° C. for 16 hours in the fluidised state. The silica was then cooled to 25° C. and stored under dry nitrogen.

All subsequent operations were carried out in a nitrogen atmosphere. 4.0 g of the silica thus dried were suspended in a solution of 0.44 g of methylaluminoxane (Witco, Bergkamen, Germany) in 17 g of toluene. The suspension was agitated for 2 hours at 25° C. The silica thus treated was washed five times with 20 ml of toluene. The treated silica was then dried under vacuum.

The silica thus treated was suspended in 20 ml of toluene and 0.155 g of the above iron complex (see 5a) was added. The suspension was agitated for 17 hours at 25° C. The catalyst thus prepared was washed five times with 20 ml of toluene. The catalyst was then dried under vacuum.

The catalyst thus prepared contained 0.41% by weight of iron and 3.61% by weight of aluminium. This corresponds to an atomic ratio Al/Fe of 18.0

Example 6c

Ethylene Polymerisation in the Gas Phase 400 g of polyethylene pellets were introduced into a stainless steel reactor of capacity 2.5 liters equipped with a stirrer and maintained under a nitrogen atmosphere. The reactor was heated to 99.5° C., stirred at 25 rpm and 0.7 g of silica previously treated with 1.5 mmole/g of triethylaluminium was added as poison scavenger. Next 0.1184 g of the above catalyst (see 6b) was added. Then hydrogen was introduced to pressure the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hour and 47 minutes, during which period 244 g of polyethylene were produced. This corresponds to a catalyst yield of 2061 g polymer/g catalyst. The average activity during this polymerisation was 2238 g/mM.h.b. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load) (MI)=1.77
melt index (21.6 kg load) (HLMI)=95.9
melt index ratio (HLMI/MI)=54.2
residual iron level=2.0 ppm

Example 7a

Preparation of 2,6-diacetylpyridine bis (2,4,6-trimethylphenyl amine)FeCl$_2$ Complex This was carried out exactly as described in example 5a.

Example 7b

Preparation of the Catalyst

The equipment used for calcining the silica support was as in Example 5b. Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 800° C. at a rate of 100° C./h. The silica was then maintained at 800° C. for 16 hours in the fluidised state. The silica was then cooled to 25° C. and stored under dry nitrogen.

All subsequent operations were carried out in a nitrogen atmosphere. 4.0 g of the silica thus dried were suspended in a solution of 0.317 g of methylaluminoxane (Witco, Bergkamen, Germany) in 17 g of toluene. The suspension was agitated for 2 hours at 25° C. The silica thus treated was washed five times with 20 ml of toluene. The treated silica was then dried under vacuum.

The silica thus treated was suspended in 20 ml of toluene and 0.077 g of the above iron complex (see 5a) was added. The suspension was agitated for 17 hours at 25° C. The catalyst thus prepared was washed five times with 20 ml of toluene. The catalyst was then dried under vacuum.

The catalyst thus prepared contained 0.206% by weight of iron and 2.59% by weight of aluminium. This corresponds to an atomic ratio Al/Fe of 26.0

Example 7c

Ethylene Polymerisation in the Gas Phase 400 g of polyethylene pellets were introduced into a stainless steel reactor of capacity 2.5 liters equipped with a stirrer and maintained under a nitrogen atmosphere. The reactor was heated to 99.8° C., stirred at 25 rpm and 0.7 g of silica previously treated with 1.5 mmole/g of triethylaluminium was added as poison scavenger. Next 0.1150 g of the above catalyst (see 7b) was added. Then hydrogen was introduced to pressure the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hour and 23 minutes, during which period 124 g of polyethylene were produced. This corresponds to a catalyst yield of 1078 g polymer/g catalyst. The average activity during this polymerisation was 3302 g/mM.h.b. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load) (MI)=1.42
melt index (21.6 kg load) (HLMI)=73.3
melt index ratio (HLMI/MI)=51.6
residual iron level=1.8 ppm Example 8a Preparation of 2,6-diacetylpyridine bis(2,6-dimethyl-4-tertbutylphenyl-amine)FeCL$_2$ complex 4 g of 2,6-diacetylpyridine, 13.5 ml of 2,6-dimethyl-4-tertbutyl-aniline and 0.2 g of p-toluenesulphonic acid monohydrate were added to 150 ml of dry toluene in a 250 ml round bottomed flask. A 20 ml Dean-Stark heavy fractionating column and condenser were attached and the mixture heated with stirring to 160° C. The reaction appeared to have gone to completion in about 3 hours. The solution was then evacuated and 100 ml of methanol added. 2,6-diacetylpyridine bis (2,6-dimethyl-4-tertbutylphenyl amine) precipitated out and was isolated by filtration and washed with 3 aliquots of 10 ml of methanol.

3.19 g of iron(II) chloride were weighed into a half liter Schlenk tube and 400 ml of n-butanol added. The suspension was warmed to 90° C. and stirred for 3 hours. 12.2 g of 2,6-diacetylpyridine bis (2,6-dimethyl-4-tertbutylphenyl amine) was added as a solid at 80° C. The reaction was stirred for 1 hour then at 25° C. over 3 days. The resultant blue suspension was allowed to settle and the supernatant liquid decanted off. 2 washes of the precipitate with 200 ml aliquots of toluene were carried out, followed by one wash with 100 ml of n-pentane. The residual blue solid was pumped in vacuo for 6 hours till dry. It was stored and handled in a nitrogen atmosphere.

Example 8b

Preparation of the Catalyst

The equipment used for calcining the silica support was as in Example 5b. Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). Next the calcinator was heated from 60 to 600° C. at a rate of 100° C./h. The silica was then maintained at 600° C. for 16 hours in the fluidised state. The silica was then cooled to 25° C. and stored under dry nitrogen.

All subsequent operations were carried out in a nitrogen atmosphere. 5.27 g of the silica thus dried were suspended in a solution of 0.33 g of methylaluminoxane (Witco, Bergkamen, Germany) in 17.1 g of toluene. The suspension was agitated for 2 hours at 25° C. The silica thus treated was washed five times with 20 ml of toluene. The treated silica was then dried under vacuum.

1.46 g of the treated silica were suspended in 20 ml of toluene and 0.077 g of the above iron complex (see 4a) was added. The suspension was agitated for 17 hours at 25° C. The catalyst thus prepared was washed five times with 20 ml of toluene. The catalyst was then dried under vacuum.

The catalyst thus prepared contained 0.2% by weight of iron and 3% by weight of aluminium. This corresponds to an atomic ratio Al/Fe of 31.

Example 8c

Ethylene Polymerisation in the Gas Phase 400 g of polyethylene pellets were introduced into a stainless steel reactor of capacity 2.5 liters equipped with a stirrer and maintained under a nitrogen atmosphere. The reactor was heated to 100° C., stirred at 25 rpm and 0.7 g of silica previously treated with 1.5 mmole/g of triethylaluminium was added as poison scavenger. Next 0.1214 g of the above catalyst (see 8b) was added. Then hydrogen was introduced to pressure the reactor to 0.1 MPa. Finally ethylene was fed until a total pressure of 0.8 MPa was obtained. Ethylene was fed to maintain this pressure throughout the reaction. After production corresponding to 50 g polyethylene per gram of catalyst, the stirring rate was increased to 100 rpm, after the production of 50 g of polyethylene the stirring rate was increased further to 150 rpm and after the production of 100 g of polyethylene the stirring rate was increased further to 200 rpm.

Polymerisation was allowed to continue for 1 hour and 23 minutes, during which period 252 g of polyethylene were produced. This corresponds to a catalyst yield of 2076 g polymer/g catalyst. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load) (MI)=2.64 melt index (5 kg load)=9.60 melt index (8.5 kg load)=23.7 melt index (21.6 kg load) (HLMI)=156 melt index ratio (HLMI/MI)=59.1 residual iron level=1.2 ppm

What is claimed is:

1. Catalyst for the polymerisation of olefins comprising (1) a complex having the formula (I)

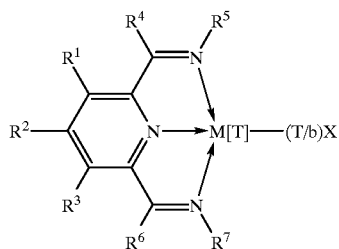

Formula (I)

wherein M is a transition metal selected from the group consisting of Fe[II], Fe[III], Co[I], Co[II], Co[III], Mn[I], Mn[II], Mn[III], Mn[IV], Ru[II], Ru[III] and Ru[IV]; X represents an atom or group covalently or ionically bonded to the transition metal M; T is the oxidation state of the metal; b is the valency of the atom or group X; and $R^1$ to $R^7$ are each independently selected from hydrogen, halogen, hydrocarbyl, substituted hydrocarbyl, heterohydrocarbyl, substituted heterohydrocarbyl or $SiR'_3$ where each R' is independently selected from hydrogen, halogen, hydrocarbyl, substituted hydrocarbyl, heterohydrocarbyl, or substituted heterohydrocarbyl; and when any two or more of $R^1$ to $R^7$ are hydrocarbyl, substituted hydrocarbyl, heterohydrocarbyl or substituted heterohydrocarbyl, said two or more of $R^1$ to $R^7$ can be linked to form one or more cyclic substituents;

(2) an activator which is an alkylalumoxane; and (3) a support material, wherein the atomic ratio of aluminium in the alkylalumoxane (2) to transition metal M in complex (1) is from 6:1 to 25:1.

2. Catalyst according to claim 1 wherein the atomic ratio of aluminium to transition metal M is from 8:1 to 22:1.

3. Catalyst according to claim 2 wherein the atomic ratio of aluminium to transition metal M is from 12:1 to 18:1.

4. Catalyst according to claim 1 wherein the activator (2) is a ($C_1$–$C_4$) alkylalumoxane.

5. Catalyst according to claim 4 wherein the activator (2) is methylalumoxane (MAO) or modified methylalumoxane (MMAO).

6. Catalyst according to claim 1 wherein $R^5$ is represented by the group "P" and $R^7$ is represented by the group "Q":

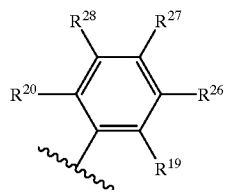

Group P

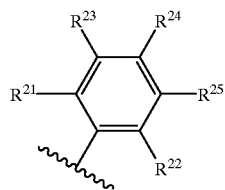

Group Q wherein $R^{19}$ to $R^{28}$ are independently selected from hydrogen, halogen, hydrocarbyl, substituted hydrocarbyl, heterohydrocarbyl or substituted heterohydrocarbyl; and when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more of $R^1$ to $R^4$, $R^6$ and $R^{19}$ to $R^{28}$ can be linked to form one or more cyclic substituents.

7. Catalyst according to claim 6 wherein $R^1$, $R^2$, $R^3$, $R^4$, $R^6$, $R^{19}$, $R^{20}$, $R^{21}$, $R^{22}$, $R^{23}$, $R^{25}$, $R^{26}$ and $R^{28}$ are independently selected from hydrogen and $C_1$ to $C_8$ hydrocarbyl, preferably methyl, ethyl, n-propyl, n-butyl, t-butyl, n-hexyl, n-octyl, phenyl and benzyl.

8. Catalyst according to any of claim 1 wherein $R^5$ is a group having the formula —$NR^{29}R^{30}$ and $R^7$ is a group having the formula —$NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl; and when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more of $R^1$ to $R^4$, $R^6$ and $R^{29}$ to $R^{32}$ can be linked to form one or more cyclic substituents.

9. Catalyst according to any of claim 7 wherein $R^{24}$ and $R^{27}$ are each independently selected from the group consisting of fluorine, chlorine, bromine or iodine, or each independently selected from the group consisting of ethyl, n-propyl, iso-propyl, n-butyl, sec-butyl, tert.-butyl, n-pentyl, neopentyl, n-hexyl, 4-methylpentyl, n-octyl, phenyl and benzyl.

10. Catalyst according to claim 1 wherein the transition metal M is Fe(II), Fe(III) or Co(II).

11. Catalyst according to claim 1 wherein X is selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, and β-diketonates.

12. Catalyst according to claim 1 wherein X is selected from the group consisting of chloride, bromide, methyl, ethyl, propyl, butyl, octyl, decyl, phenyl, benzyl, methoxide, ethoxide, isopropoxide, tosylate, triflate, formate, acetate, phenoxide and benzoate.

13. Catalyst according to claim 1 wherein the complex (I) is selected from the group consisting of 2,6-diacetylpyridinebis(2,6 dimethyl 4, t-butyl anil)$FeCl_2$, 2,6-diacetylpyridinebis(2,6 dimethyl 4, t-butyl anil)$CoCl_2$, 2,6-diacetylpyridinebis(2,6 dimethyl 4, t-butyl anil)$FeBr_2$, 2,6-diacetylpyridinebis(4, t-butyl anil)$FeCl_2$, 2,6- diacetylpyridinebis(2,6-dimethyl 4-phenyl anil)FeCl₂ and 2,6-diacetylpyridinebis(2-methyl, 4-fluoroanil) FeCl₂.

14. Catalyst according to claim 1 which further comprises a neutral Lewis base.

15. Catalyst according to claim 14 wherein the neutral Lewis base is selected from alkenes that are internal olefins, alkynes, primary, secondary and tertiary amines, amides, phosphoramides, phosphines, phosphites, ethers, thioethers, nitrites, esters, ketones, aldehydes, carbon monoxide and carbon dioxide, sulphoxides, sulphones and boroxines.

16. Catalyst according to claim 1 wherein the support material comprises silica, alumina, MgCl₂ or zirconia, or a polymer or prepolymer comprising polyethylene, polypropylene, polystyrene, or poly(aminostyrene).

17. Process for the polymerisation or copolymerisation of 1-olefins, comprising contacting a monomeric olefin under polymerisation conditions with a catalyst as defined in claim 1.

18. Process for the polymerisation or copolymerisation of 1-olefins, comprising the steps of:

a) preparing a prepolymer-based catalyst by contacting one or more 1-olefins with a catalyst as defined in claim 1, and b) contacting the prepolymer-based catalyst under polymerization conditions with one or more 1-olefins.

19. Process according to claim 17 wherein the polymerisation is conducted in the presence of trimethylaluminium (TMA), triethylaluminium (TEA), tri-isobutylaluminium (TIBA), tri-n-octylaluminium, methylaluminium dichloride, ethylaluminium dichloride, dimethylaluminium chloride, diethylaluminium chloride, ethylaluminiumsesquichloride or methylaluminiumsesquichloride.

20. Process according to claim 17 wherein the polymerisation is conducted in the presence of hydrogen as a molecular weight modifier.

21. Process according to claim 17 wherein the polymerisation conditions are solution phase, slurry phase or gas phase.

22. Process according to claim 21 wherein the polymerisation is conducted under gas phase fluidised bed conditions.

23. Process according to claim 21 wherein the polymerisation is conducted in slurry phase in an autoclave or continuous loop reactor.

24. Catalyst according to claim 4, wherein the $C_{1-C4}$ alkyl group of the $C_{1-C4}$ alkylalumoxane is selected from the group consisting of methyl, ethyl, propyl and isobutyl.

25. Catalyst according to claim 7, wherein the $C_1$ to $C_8$ group of the $C_1$ to $C_8$ hydrocarbyl is selected from the group consisting of methyl, ethyl, n-propyl, n-butyl, t-butyl, n-hexyl, n-octyl, phenyl and benzyl.

26. Catalyst according to claim 1 wherein the complex (I) is selected from the group consisting of 2,6-diacetylpyridinebis (2,6-diisopropylanil)FeCl₂, 2,6-diacetylpyridine(2,6-diisopropylanil)MnCl₂, 2,6-diacetylpyridine(2,6-diisopropylanil)CoCl₂, 2,6-diacetylpyridinebis (2-tert.-butylanil)FeCl₂, 2-6-diacetylpyridinebis(2,3-dimethylanil)FeCl₂, 2,6-diacetylpyridinebis(2-methylanil)FeCl₂, 2,6-diacetylpyridinebis (2,4-dimethylanil)FeCl₂, 2-6-diacetylpyridinebis(2,6-dimethylanil)FeCl₂, 2,6-diacetylpyridinebis(2,4,6-trimethylanil)FeCl₂, 2,6-dialdiminepyridinebis (2,6-dimethylanil)FeCl₂, 2,6-dialiminepyridinebis(2,6-diethylanil)FeCl₂, 2,6-dialdiminepyridinebis(2,6-diisopropylanil)FeCl₂, 2,6-dialdiminepyridinebis (1-naphthil)FeCl₂ and 2,6-bis(1,1-diphenylhydrazone)pyridine.FeCl₂.

27. A catalyst for the polymerisation of olefins comprising (1) a complex having the formula (T)

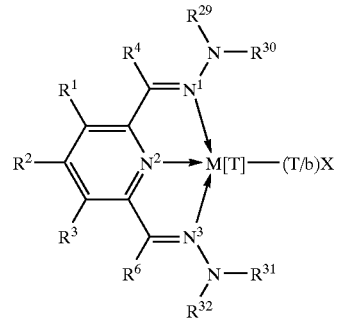

Formula T wherein M is a transition metal selected from the group consisting of Fe[II], Fe[III], Co[I], Co[II], Co[III], Mn[I], Mn[II], Mn[III], Mn[IV], Ru[II], Ru[III]and Ru[IV]; X represents an atom or group covalently or ionically bonded to the transition metal M; T is the oxidation state of the metal; b is the valency of the atom or group X; and $R^1$ to $R^4$, $R^6$ and $R^{29}$ to $R^{32}$ are each independently selected from hydrogen, halogen, hydrocarbyl, substituted hydrocarbyl, heterohydrocarbyl, substituted heterohydrocarbyl; and when any two or more of $R^1$ to $R^4$, $R^6$ and $R^{29}$ to $R^{32}$ are hydrocarbyl, substituted hydrocarbyl, heterohydrocarbyl or substituted heterohydrocarbyl, said two or more of $R^1$ to $R^4$, $R^6$ and $R^{29}$ to $R^{32}$ can be linked to form one or more cyclic substituents;

(2) an activator which is an alkylalumoxane; and (3) a support material, wherein the atomic ratio of aluminium in the alkylalumoxane (2) to transition metal M in complex (1) is from 6:1 to 25:1.

28. Catalyst according to claim 27 wherein the atomic ratio of aluminium to transition metal M is from 8:1 to 22:1.

29. Catalyst according to claim 28 wherein the atomic ratio of aluminium to transition metal M is from 12:1 to 18:1.

30. Catalyst according to claim 27 wherein the activator (2) is a $(C_1–C_4)$ alkylalumoxane.

31. Catalyst according to claim 30 wherein the activator (2) is methylalumoxane (MAO) or modified methylalumoxane (MMAO).

32. Catalyst according to claim 27 wherein the transition metal M is Fe(II), Mn(II) or Co(II).

33. Catalyst according to claim 27 wherein X is selected from the group consisting of halide, sulphate, nitrate, thiolate, thiocarboxylate, $BF_4$, $PF_6$, hydride, hydrocarbyloxide, carboxylate, hydrocarbyl, substituted hydrocarbyl, heterohydrocarbyl, and β-diketonates.

34. Catalyst according to claim 27 wherein X is selected from the group consisting of chloride, bromide, methyl, ethyl, propyl, butyl, octyl, decyl, phenyl, benzyl, methoxide, ethoxide, isopropoxide, tosylate, triflate, formate, acetate, phenoxide and benzoate.

35. Catalyst according to claim 27 which further comprises a neutral Lewis base.

36. Catalyst according to claim 35 wherein the neutral Lewis base is selected from the group consisting of alkenes that are internal olefins, alkynes, primary, secondary and tertiary amines, amides, phosphoramides, phosphines, phosphites, ethers, thioethers, nitriles, esters, ketones, aldehydes, carbon monoxide, carbon dioxide, sulphoxides, sulphones and boroxines.

37. Catalyst according to claim 27 wherein the support material comprises silica, alumina, MgCl₂ or zirconia, or a polymer or prepolymer comprising polyethylene, polypropylene, polystyrene, or poly(aminostyrene).

38. Process for the polymerisation or copolymerisation of 1-olefins, comprising contacting a monomeric olefin under polymerisation conditions with a catalyst as defined in claim 27.

39. Process for the polymerisation or copolymerisation of 1-olefins, comprising the steps of:
   a) preparing a prepolymer-based catalyst by contacting one or more 1-olefins with a catalyst as defined in claim 27, and
   b) contacting the prepolymer-based catalyst under polymerisation conditions with one or more 1-olefins.

40. Process according to claim 38 wherein the polymerisation is conducted in the presence of trimethylaluminium (TMA), triethylaluminium (TEA), tri-isobutylaluminium (TIBA), tri-n-octylaluminium, methylaluminium dichioride, ethylaluminium dichioride, dimethylaluminium chloride, diethylaluminium chloride, ethyaluminiumsesquichloride or methylaluminiumsesquichloride.

41. Process according to claim 38 wherein the polymerisation is conducted in the presence of hydrogen as a molecular weight modifier.

42. Process according to claim 38 wherein the polymerisation conditions are solution phase, slurry phase or gas phase.

43. Process according to claim 42 wherein the polymerisation is conducted under gas phase fluidised bed conditions.

44. Process according to claim 42 wherein the polymerisation is conducted in slurry phase in an autoclave loop reactor.

45. Catalyst according to claim 30 wherein the $C_1$–$C_4$ alkyl group of the $C_1$–$C_4$ alkylalumoxane is selected from the group consisting of methyl, ethyl, propyl and isobutyl.

* * * * *

UNITED STATES PATENT AND TRADEMARK OFFICE
CERTIFICATE OF CORRECTION

PATENT NO.    : 6,677,267 B2
DATED         : January 13, 2004
INVENTOR(S)   : Alain Berardi et al.

It is certified that error appears in the above-identified patent and that said Letters Patent is hereby corrected as shown below:

Title Page,
Item [57], ABSTRACT,
Line 1, "The present invention relates to a process" should read -- A process --;
Line 4, after "wherein M is", insert -- a transition metal selected from --;
Line 9, "R 1 to R 7" should read -- $R^1$ to $R^7$ --;
Line 12, "SiR' 3" should read -- $SiR'_3$ --;
Line 15, "R 1 to R 7" should read -- $R^1$ to $R^7$; and
after line 21, insert the following missing structure:

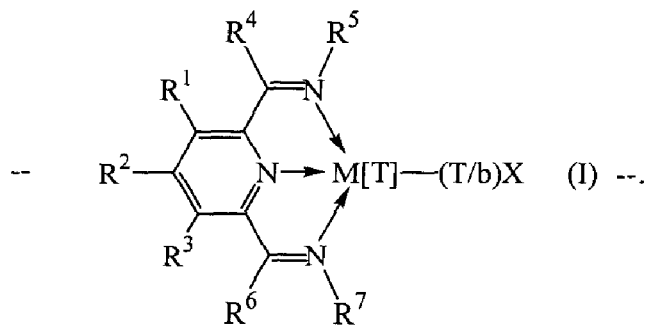

Column 23,
Line 21, "Catalyst" should read -- A catalyst --.

Column 24,
Line 30, "hydrocarbyl," should read -- hydrocarbyl. --.
Lines 31-32, delete "preferably methyl, ethyl, n-propyl, n-butyl, t-butyl, n-hexyl, n-octyl, phenyl and benzyl.".
Line 33, after "according to", delete "any of".
Line 43, after "according to", delete "any of".
Line 53, after "from" and before "halide,", insert -- the group consisting of --.

Column 25,
Line 6, after "is selected from", insert -- the group consisting of --.
Line 9, "nitrites," should read -- nitriles, --; and "carbon monoxide and" should read -- carbon monoxide, --.
Line 45, "$C_{1-C4}$" should read -- $C_1$-$C_4$ --.
Line 46, "$C_{1-C4}$" should read -- $C_1$-$C_4$ --.

UNITED STATES PATENT AND TRADEMARK OFFICE
CERTIFICATE OF CORRECTION

PATENT NO. : 6,677,267 B2
DATED : January 13, 2004
INVENTOR(S) : Alain Berardi et al.

It is certified that error appears in the above-identified patent and that said Letters Patent is hereby corrected as shown below:

Column 26,
Line 20, "Ru[III]and" should read -- Ru[III] and --.
Line 49, "$BF_4$, $PF_6$," should read -- $BF_4^-$, $PF_6^-$, --.
Line 65, "suiphones" should read -- sulphones --.

Column 27,
Line 17, "dichioride," should read -- dichloride, --.
Line 18, "dichioride," should read -- dichloride, --.

Signed and Sealed this

Eleventh Day of January, 2005

JON W. DUDAS
*Director of the United States Patent and Trademark Office*